April 8, 1958 J. V. JACKSON 2,830,005

PATTERNED LAMINATED PAPER PRODUCT AND METHOD OF MAKING SAME

Filed Feb. 29, 1956

INVENTOR
John V. Jackson
BY
Pennie, Edmonds, Morton, Barrows & Taylor
ATTORNEYS

United States Patent Office 2,830,005

Patented Apr. 8, 1958

2,830,005

PATTERNED LAMINATED PAPER PRODUCT AND METHOD OF MAKING SAME

John V. Jackson, Milford, N. J., assignor to Riegel Paper Corporation, New York, N. Y., a corporation of Delaware Application February 29, 1956, Serial No. 568,593

10 Claims. (Cl. 154—138)

This invention relates to a laminated paper product having what may be termed an alligator pattern design. More particularly, the invention is concerned with such a paper product which is transparent and which is useful particularly for wrapping purposes.

I have discovered that the application of heat to a plain laminated paper product comprising a base paper, a coating of wax and a film of polyethylene laminated to the wax coating produces an esthetically attractive pattern in the polyethylene laminant and/or the wax laminant. This pattern is much similar to what has come to be known as an alligator pattern and is particularly well defined and distinct where the base paper has been dry waxed, that is, impregnated with wax prior to being supplied with a surface coating of wax. I have furthermore found that the pattern is more distinct and stands out better where the heating of the laminated product is accomplished by radiant heat.

Figure 1:
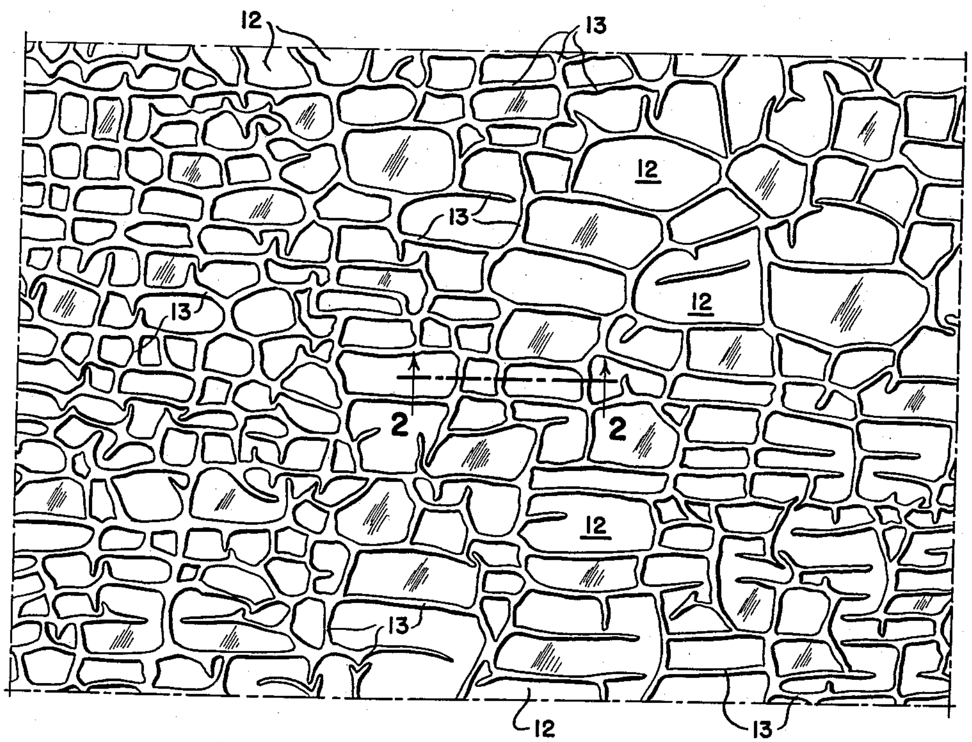
Figure 2:
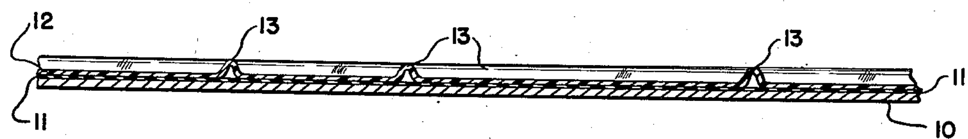

For a more detailed understanding of the novel product of the invention and of the method by which it may be made, reference may be had to the following more specific description thereof taken in connection with the accompanying drawing in which:

Fig. 1 is a plan view of a patterned laminated product according to this invention; and Fig. 2 is an enlarged cross sectional view taken on line 2—2 of Fig. 1.

As previously indicated, the patterned product comprises a base sheet of paper 10 preferably, as indicated, impregnated with a wax of the type normally employed in the manufacture of wax paper, for example a paraffin wax. The base paper is next coated with a layer 11 of preferably the same type of wax and to an extent such that the total amount of wax thereafter contained on and in the base sheet amounts to about 15% to 25% by weight thereof. Following the application of the surface coating of wax, a thin film of polyethylene 12 is adhered to the latter, preferably by extrusion thereon in a well known manner. The amount of polyethylene is preferably from about 10% to 15% by weight of the final product. The laminated product made up of the base paper component, the wax component and the polyethylene film component thus formed is plain, that is, free from design or pattern.

To obtain the pattern illustrated in Fig. 1 made up of the pattern lines 13, the base paper-wax-polyethylene laminated product is subjected to heating preferably by a radiant heater, though a contact heater or convection heater may be employed, at a temperature of from about 125° to 250° F. for from about 1/100 to about 5 seconds. While I cannot say positively what takes place upon this heating, I presently believe that the wax expands and forces portions of the polyethylene away from the base paper. Upon cooling I believe the wax then contracts leaving the aforementioned portions of the polyethylene film delaminated to form the pattern lines. This is illustrated in Fig. 2 where it will be noted that where a pattern line intersects the section, the polyethylene film is separated from the wax layer. It has been noted experimentally that "low" temperature-"long" time heating within the ranges noted produces a large area crystal pattern whereas a "high" temperature-"short" time heating within the ranges noted produces a relatively small area crystal pattern.

I will now describe a specific example of the novel product of this invention and the manner in which it is made, the product being substantially a transparent one laced by a distinct and prominent series of pattern lines to produce the well known alligator pattern. A base paper having a weight of 23 pounds per ream (500 sheets 24" x 36") was made from a furnish of 50% by weight bleached soft wood sulphite and 50% by weight bleached southern soft wood kraft having a freeness of about 300 cc. by the Schopper-Riegler standard slowness test. This base paper, after drying, was dampened and supercalendered in a conventional manner. It was then given a 6 pound per ream wax coating by a double dip process. Upon the first dipping of the supercalendered paper into the wax bath, which was a bath of paraffin wax having a melting point of 138°–140° F., the wax was permitted to penetrate the paper. This waxing is what has been referred to previously as the wax impregnation or dry waxing. Following the second dipping of the web into the wax bath, however, the web was removed and quickly chilled to give a surface coating or layer of wax.

A thin polyethylene film in the amount of 4 pounds per ream was extruded onto one face of the waxed base paper, the polyethylene being specifically the film-forming grade sold under the name of Alathon 10 by E. I. du Pont de Nemours. This produced a laminated paper product made up of a wax impregnated base, a wax surface coating thereon and a polyethylene film adhered to one face thereof. Such product is plain, that is, free from design and fairly clearly transparent.

The thus formed product was then subjected to radiant heat at a temperature of from 125° to 250° F. for about .5 seconds. This heating produced an alligator pattern such as that illustrated in the drawing. As heretofore noted, it is not understood positively what causes the formation of this pattern, but it can be readily noted that along the pattern line the polyethylene film is free from, that is not adhered to, the wax overcoat, whereas in the spaces between the pattern lines it is. At any rate, the pattern has been found to be esthetically attractive and from this point of view at least, the product found to be useful.

I claim:

1. The method of producing a laminated paper product having a distinctive alligator pattern which comprises coating a paper base sheet with a layer of wax, laminating as a thin film thereon polyethylene in the amount of about 4 pounds per 3,000 square feet, and subjecting the thus formed laminated product to heat at a temperature of about 125° F. to about 250° F. for about 1/100 to about 5 seconds.

2. The method according to claim 1 in which the base paper sheet is so waxed that it is impregnated with wax as well as coated thereby.

3. The method according to claim 1 in which the layer of wax is a layer of paraffin wax having a melting point of about 138° F. to 140° F.

4. The method of producing an alligator patterned laminated paper product comprising forming a supercalendered base paper sheet made up of 50% by weight of a bleached soft wood sulphite and 50% by weight of a bleached southern soft wood kraft, impregnating and overcoating said base sheet with a paraffin wax having a melting point of about 138° F. to 140° F., laminating as a thin film on one surface of the waxed base paper polyethylene in the amount of about 4 pounds per 3,000 square feet, and subjecting the thus formed laminated product to radiant heat at a temperature of 125° F. to about 250° F. for about .5 second.

5. The method according to claim 4 in which the parts by weight of the components of the laminated end product are 23 parts paper, 6 parts wax and 4 parts polyethylene.

6. An alligator patterned laminated paper product comprising a paper base sheet, a layer of wax thereon and a thin film of polyethylene on said wax layer, the polyethylene film amounting to about 4 pounds per 3,000 square feet and being adhered to the wax layer at spaced portions throughout their area but being free from the wax layer intermediate said spaced portions to form pattern lines separating the spaced portions one from another.

7. The product of claim 6 in which the wax layer is made up of a paraffin wax having a melting point of about 138° F. to about 140° F.

8. The product of claim 6 in which the base paper sheet is impregnated with wax as well as coated thereby.

9. The product of claim 6 in which the parts by weight of the components thereof are 23 parts paper, 6 parts wax and 4 parts polyethylene.

10. The product of claim 9 in which the base paper is a supercalendered paper made up of 50% by weight of a bleached soft wood sulphite and 50% by weight of a bleached southern soft wood kraft.

References Cited in the file of this patent

UNITED STATES PATENTS

| | | |
|---|---|---|
| 1,503,451 | Klepper | July 29, 1924 |
| 1,922,548 | Mattin | Aug. 15, 1933 |
| 2,166,002 | Fritsch | July 11, 1939 |
| 2,175,125 | Mack et al. | Oct. 3, 1939 |
| 2,510,967 | Flanagan | June 13, 1950 |
| 2,536,048 | Flanagan | Jan. 2, 1951 |
| 2,565,491 | Francis | Aug. 28, 1951 |
| 2,667,436 | Goepfert et al. | Jan. 26, 1954 |